United States Patent

[11] 3,569,947

[72] Inventor Raymond J. Radus
Monroeville, Pa.
[21] Appl. No. 835,898
[22] Filed June 16, 1969
[45] Patented Mar. 9, 1971
[73] Assignee Westinghouse Electric Corporation
East Pittsburgh, Pa.
Continuation of application Ser. No. 167,360, Jan. 19, 1962, now abandoned.

[54] MAGNETIC MEMORY DEVICE
17 Claims, 10 Drawing Figs.

[52] U.S. Cl. .......... 340/174, 317/150, 335/230
[51] Int. Cl. .......... G11c 11/52, H01h 51/22, H01f 7/13
[50] Field of Search .......... 340/174; 335/179, 229, 230, 232; 317/123, 150

[56] References Cited

UNITED STATES PATENTS 3,128,417 4/1964 Brown et al. .......... 307/88X

FOREIGN PATENTS 731,080 6/1955 Great Britain .......... 340/174

OTHER REFERENCES

Publication I- Electrical Manufacturing; Feb. 1947 pgs. 72—77, 182, 184 and 186

*Primary Examiner*—James W. Moffitt
*Attorneys*—F. H. Henson and R. G. Brodahl

ABSTRACT: A flux transfer device wherein magnetic flux from a source divides between two parallel magnetic circuit paths according to the respective reluctance thereof and flux may be transferred from one of the paths to the other by varying the reluctance thereof through the application of control signals to control windings disposed in the respective magnetic circuit paths.

Patented March 9, 1971 | 3,569,947

2 Sheets-Sheet 1

WITNESSES

Edwin E. Bassler

Laurence D. Lerner

INVENTOR

Raymond J. Radus

BY M. J. Brodahl

ATTORNEY

MAGNETIC MEMORY DEVICE

This is a continuation application of Ser. No. 167,360, filed Jan. 19, 1962 and now abandoned.

In general this invention relates to a magnetic memory device and more particularly to an electromagnetically controlled magnetic memory device which utilizes the inherent characteristics of soft ferromagnetic material.

This is an improvement upon the subject matter described in a copending application Ser. No. 167,359, filed Jan. 19, 1962 now U.S. Pat. No. 3,228,013, by Richard D. Olson, Raymond J. Radus and Marc A. Nerenstone and assigned to the same assignee.

A ferromagnetic material must have atoms whose electron arrangement is such that magnetism is created. The atoms having these magnetic characteristics are grouped into regions called domains. In these domains it is equally probable that magnetism will occur in any one of six directions. In the iron crystal, for example, the atoms are at the corners of a cube-shaped domain with one at the center. This arrangement is called a body-centered cubic lattice. The grouping in a nickel crystal differs from this by having an atom in the center of each face but none at the center of the cube, this is called a face-centered cubic lattice. The domain in an iron crystal in the absence of an external magnetizing force has its atomic magnetic moments all lined up in a single direction, the direction of one of the edges of a cubic lattice. In a face-centered cubic lattice such as nickel, the atomic magnetic moments are in the direction of a diagonal of the cube. In unmagnetized ferromagnetic materials the domains are randomly oriented and neutralize each other. However, the magnetic forces are present. Application of an external magnetic field causes magnetism in the domains to be aligned so that their magnetic moments are added to each other and to that of the applied field.

With soft magnetic materials such as iron, small external fields will cause great alignment but because of the small restraining force only a little of the magnetism will be retained when the external field is removed. With hard magnetic materials a greater external force must be applied to cause orientation of the domains but most of the orientations will be retained when the field is removed thus creating a larger permanent magnet which will have one north and one south pole.

Materials which may be grouped as soft, range from cast iron which is one of the poorest to the iron nickel alloys which rank among the best. Alnico and barium ferrite are examples of hard magnetic materials.

The present invention utilizes the above-mentioned characteristics of soft magnetic materials by providing two or more ferromagnetic paths each having a portion common to the other paths. A source of magnetomotive force such as a permanent magnet is used to supply flux to each of the paths. If one path has less reluctance than the other paths, the majority of the domains in the above-mentioned common portion will align themselves in the direction of the path having the least reluctance. They will remain so aligned until some external energy is applied to realign them in a different direction. Control of the external energy required to rotate the domain orientation in the common portion is obtained through the use of electromagnetic control windings associated with each of the ferromagnetic paths. This control of the reluctance from one path to another classifies the device as a memory unit.

It is a general object of this invention to provide a simple magnetic memory device.

Another object is to provide a simple magnetic memory device which is electromagnetically controlled.

Another object of the invention is to provide a simple magnetic memory device which utilizes the remnant properties of ferromagnetic materials.

Another object is to provide a simple magnetic relay which is electromagnetically controlled and utilizes the domain characteristics of the soft magnetic material.

Another object is to provide a simple latching-type relay which is electromagnetically controlled.

Another object is to provide a simple and inexpensive relay mechanism which is fail-safe in operation.

Another object is to provide a static switch which is electromagnetically controlled.

Another object is to provide a simple electromagnetically controlled logic element using a multiapertured core arrangement.

Still further objects in the entire scope of applicability of the present invention will become apparent from the detailed description given hereinafter. It should be understood however that the detailed description while indicating preferred embodiments of the invention is given by way of illustration only since various changes and modifications within the spirit and scope of the invention will become apparent to those skilled in the art from this detailed description.

For a better understanding of the invention reference should be had to the accompanying drawings wherein.

Figure 1A:
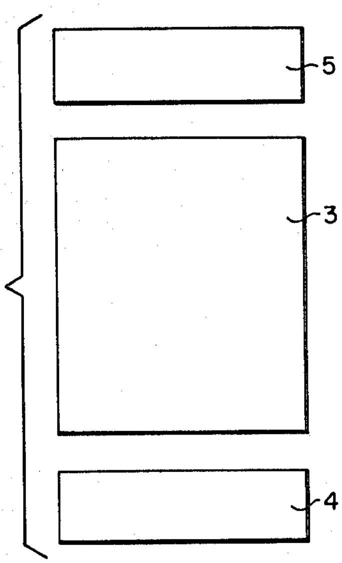
FIG. 1A is a front view of apparatus which shows the principles utilized in the present invention.
Figure 1B:
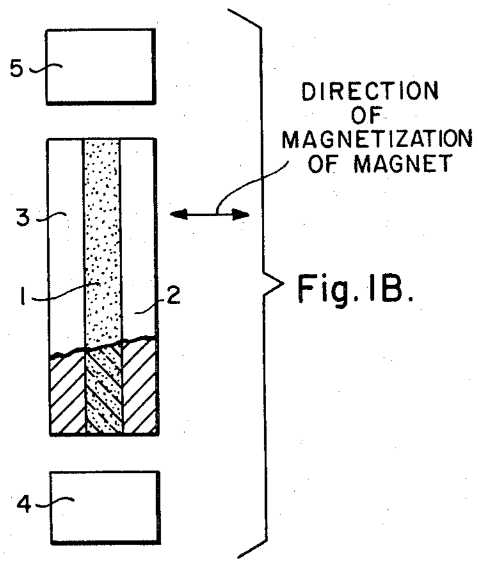
FIG. 1B is a right side view of the apparatus shown in FIG. 1A.

In FIG. 1 there is shown a ceramic permanent magnet 1 used as a source of magnetomotive force sandwiched between two soft ferromagnetic bars 2 and 3. The permanent magnet 1 is magnetized in the direction perpendicular to the soft magnetic bars 2 and 3. Two keepers 4 and 5 also made of soft magnetic materials are placed so that they may complete separate ferromagnetic paths through the common portion consisting of bars 2 and 3 and permanent magnet 1. The device comprises the ceramic permanent magnet 1 and the soft magnetic bars 2 and 3. It is capable of holding a cold-rolled low carbon steel keeper against the pole faces with a pull of approximately 26 pounds. The high coercive force of the barium ferrite material permits the magnetic link to be smaller for the same pole and magnets of other materials. In addition the flux density at the pole faces of the device shown in FIG. 1 can be raised to five times the flux density in the magnet by making the area of the pole face smaller than the magnetic area. The combination of these two design features yields a relatively small magnet which has a high-flux density at the pole faces but which has very little reach-out power. As stated previously, the device can hold one keeper, for instance keeper 4 with a pull of approximately 26 pounds. If another keeper was placed on the magnetic structure in FIG. 1 such as keeper 5 it would not be held with much force (i.e., less than 26 pounds); that is it would be held with less force than the keeper 4 only if it were placed on the structure after keeper 4 had been placed on the device.

Figure 2A:
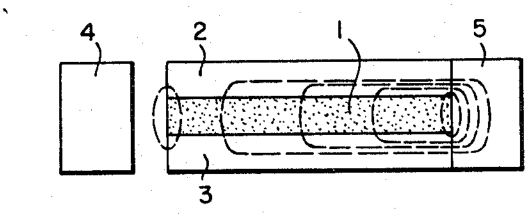
FIGS. 2A and 2B show the use of the apparatus shown in FIG. 1.
Figure 2B:
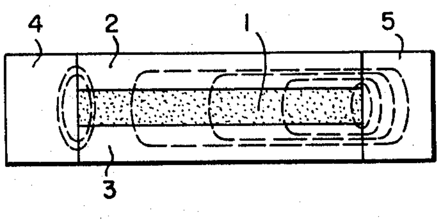

FIG. 2A shows what occurs when one keeper is placed on the device. In this figure it can be seen that the domains of the soft magnetic material in the bars 2 and 3 have aligned themselves in a direction of the flux path including permanent magnet 1, bar 2, keeper 5 and bar 3. Very few lines of flux are present in the airgap between the keeper 4 and the device. In FIG. 2B there is shown what happens when the keeper 4 is placed against the device. Though there now appears to be two separate ferromagnetic paths which are physically and magnetically equal, the flux does not divide equally between the two paths. The first path mentioned previously includes keeper 5 and the second path includes permanent magnet 1, bar 2, keeper 4 and bar 3. The domains of the soft magnetic material in bars 2 and 3 have aligned themselves in a direction of the path including keeper 5. Therefore this is still a low reluctance path for the flux applied by the permanent magnet 1 and very little will be supplied to the path including the keeper 4. This device can be used to distinguish between four possible states and for one of these states there are two alternatives of priority. The four states are: (1) no keepers; (2) keeper 4 in contact with the device, keeper 5 not in contact with the device; (3) keeper 5 in contact with the device, keeper 4 not in contact with the device; (4) keepers 4 and 5 both in contact with the device. Two alternatives of priority for state 4 are; (a) keeper 5 placed before keeper 4 and (b) keeper 4 placed before keeper 5. In a sense the above description qualifies as the design of a memory device or storage element for digital information, i.e. the device remembers which keeper was placed on it first. In FIG. 2B if keeper 5 were removed the domains would align in the path including keeper 4 and if keeper 5 was again placed against the device it would be held with much less force than keeper 4.

Figure 3A:
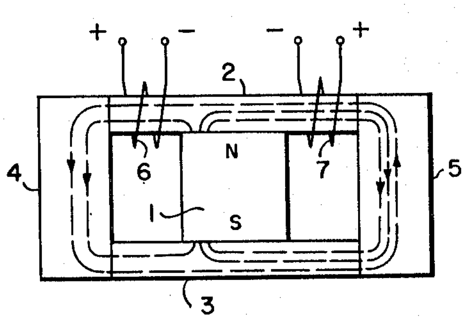
FIGS. 3A and 3B are descriptive of electromagnetic control of the phenomenon shown in FIGS. 1 and 2.
Figure 3B:
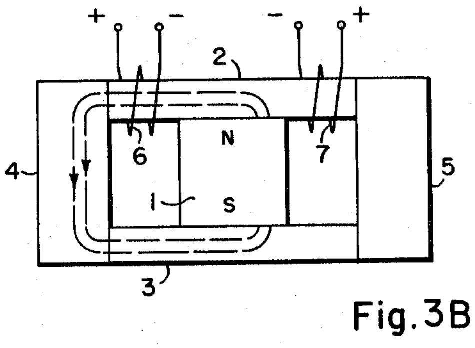

In order to achieve the control over the alignment of the domains in the common portion 2 and 3 without the necessity of moving keepers 4 and 5, electromagnetic control windings 6 and 7 were added to a device similar to the one shown in FIG. 2B whose domains were aligned in the direction of the path including keeper 5. Such a device is shown in FIG. 3A. The control winding 6 has a signal applied to it which causes a flux to be produced in the direction of the flux produced by the permanent magnet in keeper 4. The flux from the permanent magnet 1 is shown by the inner dotted lines and the electromagnetic flux from control winding 6 is shown as the outer dotted line. The electromagnetic control winding 7 produces a flux which tends to buck the flux of the ferromagnetic path including keeper 5. This superposition of the electromagnetic field on the permanent magnet field is such that the value of the electromagnetic field causes the respective reluctance of the path including keeper 4 and the permanent magnet 1 to be lower than the effective reluctance of the path including keeper 5 and permanent magnet 1. The domains in the common portion of the bars 2 and 3 are aligned in a direction of the path including keeper 4. When the electromagnetic control windings no longer supply magnetomotive force to the device as shown in FIG. 3B, the path including keeper 4 continues to have a lower reluctance than the path including keeper 5 and therefore most of the lines of flux continue to stay in this path. Thus it can be seen that pulse or short time duration signals applied to the control windings 6 and 7 can be used to switch the lines of flux emanating from the permanent magnet 1 from one path to another. It is most important to note that the magnetic fields attain equilibrium or stable state after each transfer. Its stability is not destroyed if the electromagnetic field is removed. One important feature is that with proper choice of magnitude of electromagnetic field virtually complete transfer of permanent magnet field can be achieved as shown in FIG. 3B.

Figures 4, 5, 6, 7:
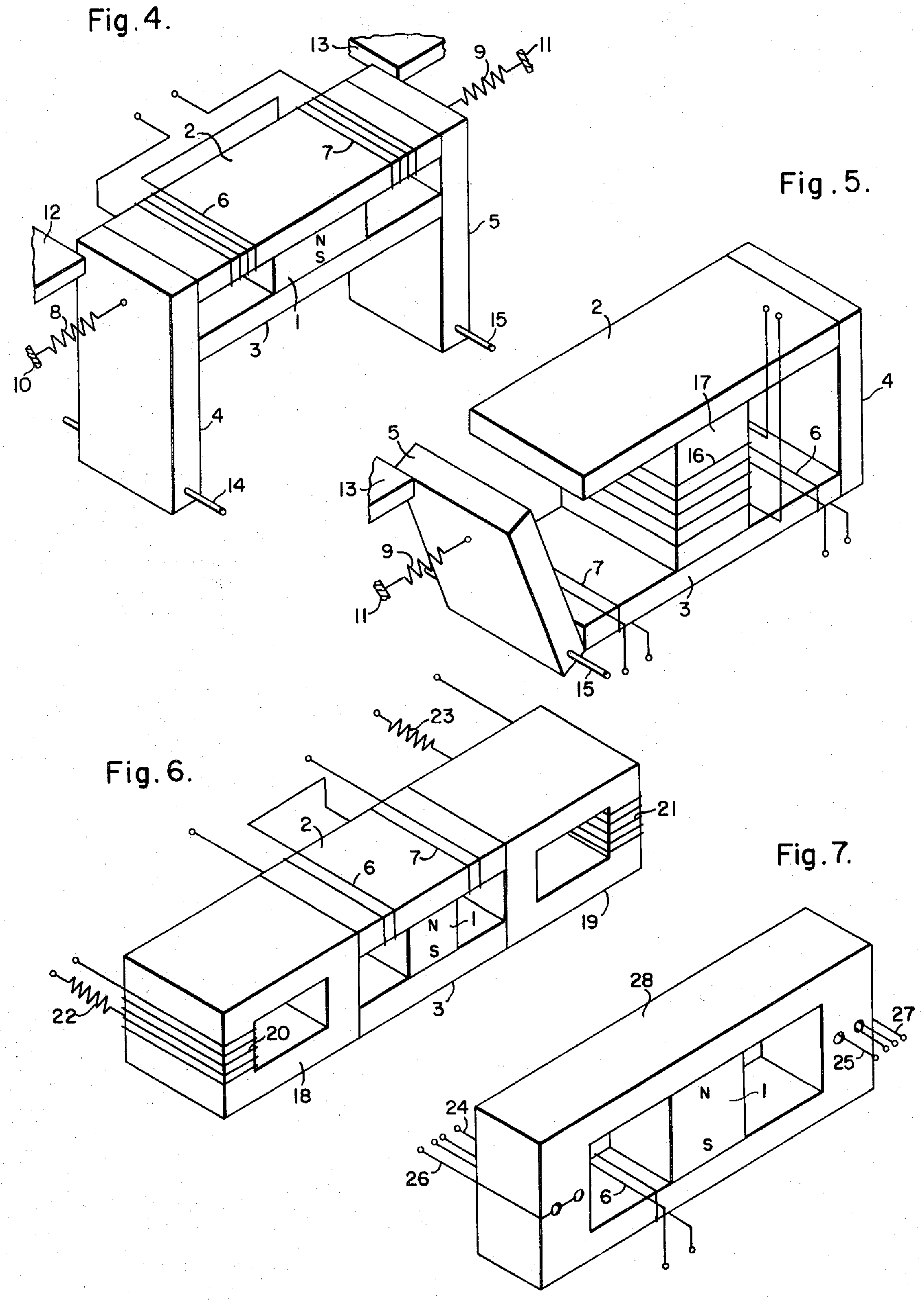
FIG. 4 shows a latching-type relay using the principles of the present invention.
FIG. 5 is another relay embodiment of the present invention having a fail-safe feature.
FIG. 6 shows a static switch using the principles of the present invention.
FIG. 7 is the showing of a static logic device using the principles of the present invention.

The use of this type of phenomenon in a relay is shown in FIG. 4. In FIG. 4 the keepers 4 and 5 have been spring biased against armature travel stops 12 and 13 respectively at one end and pivotally mounted on pivot axes 14 and 15 at the other end. Spring 8 mounted on wall 10 and spring 9 mounted on wall 11 bias their respective keepers 4 and 5 to open an airgap in their respective ferromagnetic paths. Two distinct types of operation may be obtained with this type of relay. The difference in the operation is a function of the amount of excitation in the control windings 6 and 7. The first type will be noted as normal excitation. In this case the electromagnetic field is of such a magnitude as to effect the transfer of flux concentration and/or domain alignment and minimize the residual on the weak field, and relay operation under this case of normal excitation results in the opening of one armature and the closing of the other in accordance with changes in the direction of flux produced by the electromagnetic field control windings 6 and 7.

In the second case or over excitation type of operation the electromagnetic field is more than sufficient to "buck" the permanent magnetic field and is of sufficient magnitude to attract and pull both armatures or keepers 4 and 5 onto the edges of the bars 2 and 3. The subsequent removal of the over excitation from the control windings 6 and 7 will permit one armature to be pulled via spring tension away from the edges of the poles, a spring is required to overcome the remanence magnetization of the magnetic material structure. Relay operation in this case is a positive make before break using two armatures. This is a unique type of latching relay mechanism. The latching feature of this device uses the field of a permanent magnet instead of an auxiliary assembly of ratchets and/or pawls and springs. The simplicity of construction is advantageous from the standpoint of cost, size and maintenance. There is additional advantage in power consumption since the device can be operated from a pulsed source. Another advantage of the relay shown in FIG. 4 is that it can be operated in two different modes as a function of the amount of excitation.

The application of latching-type relays in contactors is seriously limited because latching-type devices are not inherently fail-safe. Obviously, when fail-safe operation is required latching-type devices are not generally acceptable, even when auxiliary circuitry can effect the fail-safe feature. Auxiliary circuitry is most often not practical because of the expense. FIG. 5 shows a fail-safe latching relay using the principles of the present invention. The relay shown is similar to that shown in FIG. 4 except that the keeper 4 is now fixed and only the keeper 5 is movable and the permanent magnet 1 has been replaced with an electromagnet consisting of core 17 and winding 16 fed from a source of electrical energy. The power winding 16 around the center leg 17 of the device is normally energized to provide the source of magnetic energy which can be switched to either keeper 4 or keeper 5 in accordance with the theory presented previously. Since keeper 4 is fixed and keeper 5 is movable the controlled movement of keeper 5 can be used as a relay armature. The position of the armature will be a function of the polarity of the current pulses which are applied to the control windings 6 and 7.

The fail-safe feature of this device is inherent since the loss of system power will permit the spring 9 to return the armature or keeper 5 to the relay off, or open position. A discrete value of magnetic field as established by the power windings 16 must be sufficient to hold the armature 5 in the on, or closed, position, but must not be strong enough to close the armature when the power winding is reenergized after a power failure. The advantages to be gained using this device include the elimination of all mechanical ratches, pawls and cams while retaining the basic latching relay mechanism which is pulse operable and fail-safe.

A static-type relay modification of the device shown in FIG. 3 is obtained by substituting saturable reactors 18 and 19 for their respective keepers 4 and 5. The physical combination of the reactor cores and the bars 2 and 3 must be very similar with regard to airgap consideration. The memory phenomena is an inverse function of the length of the airgaps and the ability to transfer is directly related to the similarity of the length of airgaps. Windings 20 and 21 in series with resistances 22 and 23 respectively are wound around their associated cores 18 and 19. These windings are fed from coded pulse sources or alternating current sources. The series resistors 22 and 23 which detect the relative impedance of the saturable reactors 18 and 19 are used as voltage dividers in series with their associated windings. The alternating current supplies to the windings 20 and 21 act to continually monitor the effective reluctance of the path including the reactor 18 and 19.

FIG. 7 shows the adaptation of the permanent magnet memory device to a digitally controlled nondestructive readout memory device. The unique feature of this type of device is the use of the permanent magnet field to eliminate the need for rectangularity or high squareness ratio of the core material. In the many applications of digital control techniques, variety of logic functions are required. Of these logic functions one of the most important is the memory. One particular kind of memory is defined as being nondestructive readout. The feature of this type is that interrogation or repeated interrogation does not destroy the information which has been programmed into the device. The programming is done with digital techniques. Although the description given here is primarily concerned with simple memory function the combination with the OR and AND functions is also feasible.

In FIG. 7 there is shown a rectangular-shaped core member having a rectangular window within which is placed a permanent magnet 1. The core 28 has a control winding 6 wound around it to control the memory function. A primary or interrogation winding 24 is wound through two apertures in the core 28 in one path of the memory device. A secondary or output winding 26 is mutual inductive relationship with the primary winding 24 is also placed through one of the apertures in this first path. At the other end of the core 28 are a second primary or interrogation winding 25 and its associated secondary or output winding 27 in mutual inductive relation thereto in a second path of the magnetic memory device. The interrogation can be either pulse type or periodic. The coupling between the interrogation winding and the output winding is a function of the magnitude and direction of the magnetic field in the particular path. Only negligible coupling exists between the control winding 6 and the combination of interrogation and output windings 24 and 26 or 25 and 27. For application in digital systems the permeability and "squareness" of the soft magnetic material circuit is relatively unimportant. For the transfer in this type of application, which can be virtually complete, only the two extremes of permanent magnetic field bias exist. One extreme is zero bias and the other extreme is maximum bias. The corresponding outputs at the secondary windings 26 and 27 are respectively maximum and minimum. The application potential for this variety of device includes both digital and continuous operation. Both types are controllable with current pulses. The transfer mechanism can be obtained in soft ferromagnetic metals and ferrite. The simplicity of the device geometry lends itself well to wide range in sizes and consequently application.

While a few of the best known embodiments of the invention have been illustrated and described in detail, it is particularly understood that the invention is not limited thereto or thereby.

I claim:

1. A flux transfer device comprising:
- a source of magnetic flux having a pair of poles;
- first and second members comprising a magnetic material disposed respectively adjacent said pair of poles;
- a third member comprising a magnetic material adapted for disposition to complete a first magnetic circuit between said first and second members;
- a fourth member comprising a magnetic material adapted for disposition to complete a second magnetic circuit between said first and second members;
- said source of magnetic flux supplying flux to said first and second magnetic circuits in accordance with the respective reluctance thereof; and
- control winding means operative for changing the reluctance of at least one of said magnetic circuits when both said third and fourth members are in minimum airgap disposition with respect to said first and second members, respectively.

2. The device of claim 1 wherein:
- said source of magnetic flux comprises a permanent magnet; and
- said first and second members comprise first and second pole pieces respectively for said permanent magnet.

3. The device of claim 2 wherein at least one of said third and fourth members being movable with respect to said pole pieces in response to said changing of reluctance.

4. In a magnetic memory device the combination of magnetic means including a plurality of magnetic paths therein, a source of magnetomotive force common to each of said paths to supply magnetic flux thereto in accordance with the relative reluctance in each of said paths, control winding means for interacting with the flux applied to said paths so that the effective reluctance of one of said paths is lower than the reluctance of the other of said paths, and keeper means included in at least one of said paths is lower than the reluctance of the other of said paths, and keeper means included in at least one magnetic paths, said keeper being movable with respect to said magnetic path and being biased away from its magnetic path when the effective reluctance of its respective path is greater than that of any other of said paths and being operative to close its respective magnetic path when the effective reluctance of that path is less than any of the other of said paths.

5. In a magnetic memory device the combination of magnetic means including magnetic poles to provide a source of magnetic flux, keeper means disposed between the magnetic poles of said magnet means to establish a plurality of magnetic flux paths therethrough, said keeper means being normally biased away from said magnetic poles to establish an airgap in each of said magnetic paths, electromagnetic control winding means associated with each of said magnetic paths to interact with the magnetic flux in that path provided by said magnet means to control the effective reluctance of its associated path, said movable keeper means being operative to close its respective airgap in the associated magnetic path when its magnetic path has a lower reluctance in response to the interaction of flux provided by said control windings and responsive to open said airgap when the associated path has a higher reluctance.

6. In a magnetic memory device, the combination of magnetic means included in a plurality of magnetic paths therein, a source of magnetomotive force common to each of said paths to supply magnetic flux thereto, at least one of said magnetic paths including a saturable reactor having a control winding, and electromagnetic control winding means associated with each of said paths for interacting with the magnetic flux in said path provided by said source and being operative to change the reluctance of that path, with the effective impedance of the control winding of said saturable reactance changing in response to changes in the reluctance of the associated magnetic path.

7. In a magnetic memory device, the combination of magnetic means including a plurality of magnetic paths therein, a source of magnetomotive force common to each of said paths to supply magnetic flux thereto in accordance with the relative reluctance of each of said paths, a control winding disposed in at least one of said paths for inducing magnetic flux in the associated path opposed to that provided by said source so as to increase the reluctance of that path above that of the other of said paths, a primary and a secondary winding disposed in at least one of said magnetic paths, said primary and secondary windings being disposed in mutual inductive relationship to each other so that when the effective reluctance of that magnetic path is large and the primary winding is excited the secondary winding will have maximum output and conversely when effective reluctance of that magnetic path is lower than any other of said magnetic paths and the primary winding is excited the output, of the secondary winding will be a minimum.

8. A magnetic force switching device comprising a power magnet means; two means magnetically engaging respective poles of said power magnet means intermediate their ends; two magnetic armatures magnetically engageable with corresponding ends of said two means and displaceable into and out of their position of engagement to define a pair of parallel magnetic circuit paths, each path including said power magnet means; and winding means associated with at least one of said circuit paths and electrically energizable by pulses, whereby a pulse in one direction establishes a given flux configuration in said pair of magnetic circuits, and a pulse in the opposite direction produces a different given flux configuration in said pair of circuits, each flux configuration remaining substantially stable until the next opposite pulse.

9. The switching device of claim 8, in which in one of said flux configurations at least the major part of the flux passes through one of said two armatures, and in the other configuration at least the major part of the flux passes through the other of said two armatures.

10. A magnetic force switching device, comprising power magnet means; a plurality of first magnetic means having intermediate points magnetically engaging the poles of said power magnet means and including spaced arms projecting beyond said poles; second magnetic means interconnecting said spaced arms on one side of said power magnet means to complete a first magnetic circuit path including the power magnet means; a magnetic armature magnetically engageable with the ends of said arms on the other side of said power magnet means and movable into and out of magnetic engagement, whereby to provide a second magnetic circuit path in parallel with said first path; and winding means associated with one of said paths and energizing with electrical pulses, whereby a pulse in one direction switches the flux of said power magnet means from said first path to said second path, and a pulse in the opposite direction switches said flux from said second path to said first path, the flux path in each case being substantially stable until the next pulse in the opposite direction, whereby said armature is alternatively held and released.

11. The device of claim 10, wherein said first path has a substantially higher reluctance than the reluctance of said second path in the held position of said armature.

12. The device of claim 10, including resilient means urging said armature away from the held position.

13. A magnetic force switching device comprising a power magnet means; two means magnetically engaging respective poles of said power magnet means intermediate their ends, said two means being composed of a ferromagnetic material having a coerciveness higher than that of soft iron; two magnetic armatures magnetically engageable with corresponding ends of said two means and displaceable into and out of their position of engagement to define a pair of parallel magnetic circuit paths, each path including said power magnet means; and winding means associated with at least one of said circuit paths and electrically energizable by pulses, whereby a pulse in one direction establishes a given flux configuration in said pair of magnetic circuits, and a pulse in the opposite direction produces a different given flux configuration in said pair of circuits, each flux configuration remaining substantially stable until the next opposite pulse.

14. The switching device of claim 13, in which in one of said flux configurations at least the major part of the flux passes through one of said two armatures, and in the other configuration at least the major part of the flux passes through the other of said two armatures.

15. A magnetic force switching device, comprising power magnet means; a plurality of first magnetic means having intermediate points magnetically engaging the poles of said power magnet means and including spaced arms projecting beyond said poles, said magnetic means being composed of a ferromagnetic material having a coerciveness higher than that of soft iron; second magnetic means interconnecting said spaced arms on one side of said power magnet means to complete a first magnetic circuit path including the power magnet means; a magnetic armature magnetically engageable with the ends of said arms on the other side of said power magnet means and movable into and out of magnetic engagement, whereby to provide a second magnetic circuit path in parallel with said first path; and winding means associated with one of said paths and energizing with electrical pulses, whereby a pulse in one direction switches the flux of said power magnet means from said first path to said second path, and a pulse in the opposite direction switches said flux from said second path to said first path, the flux path in each case being substantially stable until the next pulse in the next pulse in the opposite direction, whereby said armature is alternatively held and released.

16. The device of claim 15, wherein said first path has a substantially higher reluctance than the reluctance of said second path in the held position of said armature.

17. The device of claim 15, including resilient means urging said armature away from the held position.